United States Patent
Shin et al.

(10) Patent No.: US 7,729,238 B2
(45) Date of Patent: Jun. 1, 2010

(54) METHOD FOR ADJUSTING FFT WINDOW POSITIONING IN MB-OFDM UWB SYSTEM

(75) Inventors: Cheol-Ho Shin, Daejon (KR); Sung-Woo Choi, Daejon (KR); Sang-In Cho, Daejon (KR); Kyu-Min Kang, Daejon (KR); Sang-Sung Choi, Daejon (KR); Kwang-Roh Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 756 days.

(21) Appl. No.: 11/635,272

(22) Filed: Dec. 7, 2006

(65) Prior Publication Data

US 2007/0133392 A1 Jun. 14, 2007

(30) Foreign Application Priority Data

Dec. 9, 2005 (KR) .................. 10-2005-0121131
Apr. 13, 2006 (KR) .................. 10-2006-0033728

(51) Int. Cl.
*H04J 11/00* (2006.01)
(52) U.S. Cl. .................. 370/210; 370/479; 375/316
(58) Field of Classification Search ............. 370/210, 370/479; 375/316
See application file for complete search history.

(56) References Cited

U.S. PATENT DOCUMENTS

| | | | |
|---|---|---|---|
| 6,650,617 B1 * | 11/2003 | Belotserkovsky et al. | ... 370/210 |
| 2003/0053564 A1 * | 3/2003 | Kim et al. | ............ 375/326 |
| 2006/0176802 A1 * | 8/2006 | Ko et al. | ............ 370/208 |
| 2007/0127373 A1 * | 6/2007 | Ho et al. | ............ 370/229 |
| 2009/0080547 A1 * | 3/2009 | Naka et al. | ............ 375/260 |

FOREIGN PATENT DOCUMENTS

KR 1020010045947 6/2001
KR 1020010083190 8/2001

OTHER PUBLICATIONS

Ecma International, "MAC-PHY Interface for ECMA-368", 1st Edition / Dec. 2005.*

(Continued)

*Primary Examiner*—Ricky Ngo
*Assistant Examiner*—Luat Phung
(74) *Attorney, Agent, or Firm*—Ladas & Parry LLP

(57) ABSTRACT

Provided is a method for adjusting Fast Fourier Transform (FFT) window positioning in a Multi Band Orthogonal Frequency Division Multiplexing Ultra-Wideband (MB-OFDM UWB) system. The method includes the steps of acquiring an initial FFT window position and a frequency hopping position, demodulating a received signal by using the initial FFT window position and the frequency hopping position acquired in the acquiring step, transmitting received data information to a Media Access Control (MAC) layer with a reception frame (RX frame) structure and judging at the MAC layer whether or not a packet error is occurred based on Frame Check Sequences (FCSs), and if no packet error is occurred, returning to the demodulating step, and if the packet error is occurred, changing a register map by using a predetermined interface line in a MAC-physical layer (MAC-PHY) interface to thereby adjust the FFT window position and the frequency hopping position, and then returning to the demodulating step.

20 Claims, 6 Drawing Sheets

OTHER PUBLICATIONS

Cheol-Ho Shin, et al; "A MB-OFDM UWB Receiver Design and Evaluation Using 4. Parallel Synchronization Architecture", Paper of the Korea Institute of Electromagnetic Engineering & Science, pp. 1075-1085, Nov. 2005.

Notice of Korean Patent Grant dated Sep. 13, 2007 for the corresponding application KR10-2006-0033728.

Fernandez-Getino Garcia, M. Julia, "Tracking of Time Misalignments for OFDM Systems in Multipath Fading Channels", Nov. 2002, *IEEE Transactions on Consumer Electronics* vol. 48, No. 4.

* cited by examiner

-Sampling time=50 ns
-1 OFDM symbol=80 samples(16+64)

-Sampling time=1.894 ns
-1 OFDM symbol=165 samples(32+128+5)

1. symbol timing estimation
2. AGC setting
3. carrier frequency estimation
4. synchronization within a packet
5. channel estimation
6. tracking

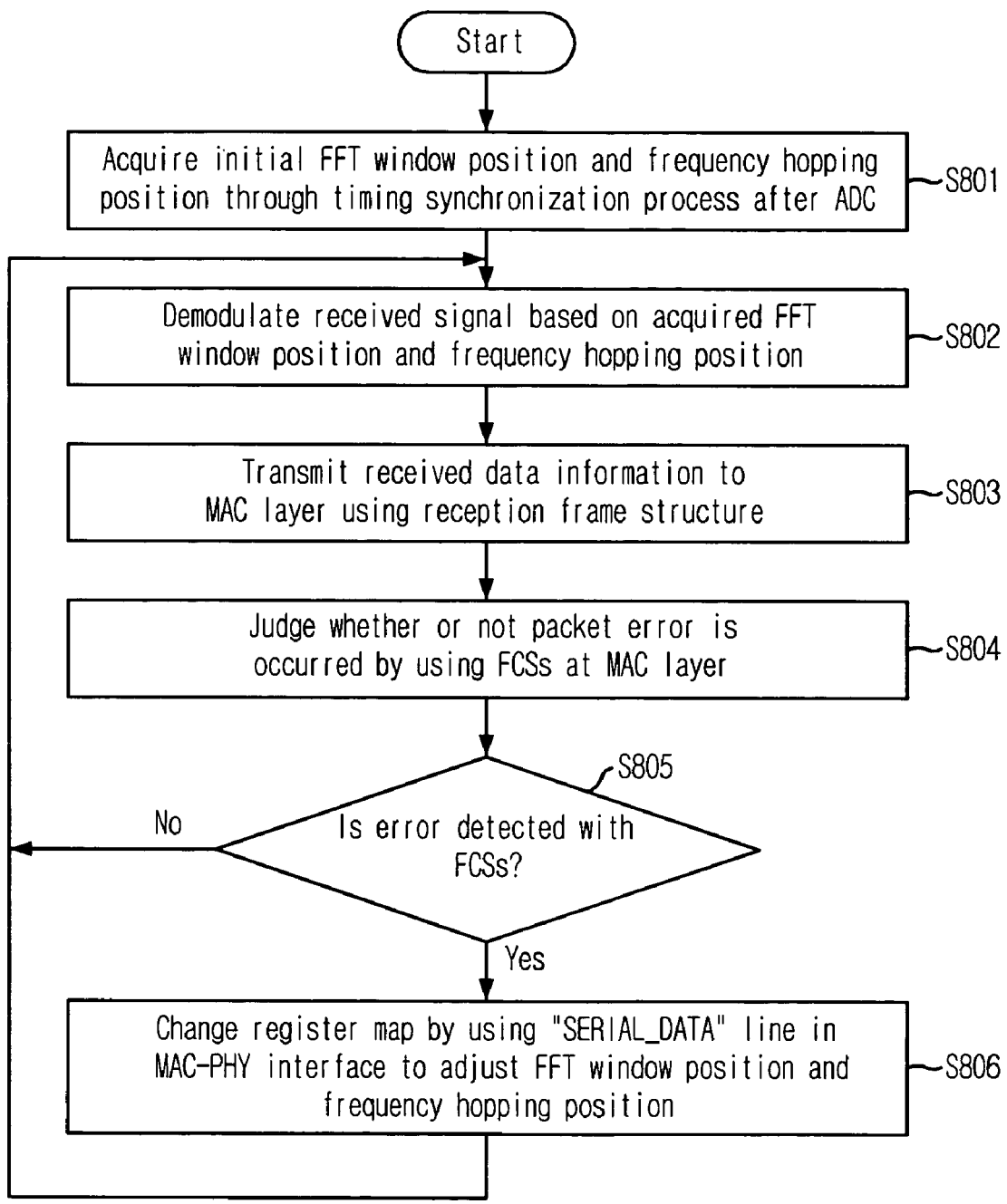

METHOD FOR ADJUSTING FFT WINDOW POSITIONING IN MB-OFDM UWB SYSTEM

FIELD OF THE INVENTION

The present invention relates to a Multi Band Orthogonal Frequency Division Multiplexing Ultra Wideband (MB-OFDM UWB) system; and, more particularly, to a method for adjusting Fast Fourier Transform (FFT) window positioning in an MB-OFDM UWB system which is capable of improving the reception probability of packets by overcoming a sampling clock offset effect that may occur due to a frequency offset of local oscillators between a transmitter and a receiver and a multipath effect by ultra-wideband transmission characteristics.

DESCRIPTION OF RELATED ART

It is known in the art that UWB adopts an MB-OFDM system whose basic technique is developed by Texas Instrument Inc. as a very high speed wireless communication standard that uses a frequency range of 3.1 to 10.6 GHz. Since such MB-OFDM UWB system enables a high capacity data transmission at a transfer rate that is 10 times faster than that of an existing Wi-Fi Wireless LAN (WLAN) with a merit for a low power, it can readily transmit/receive a moving image such as a video.

FIG. 1 shows a view for describing an example of a symbol structure of an existing IEEE 802.11a WLAN system.

The symbol structure of the existing IEEE 802.11a WLAN system is composed of 64 samples 101 to be used as an input of FFT and 16 Cyclic Prefixes (CPs) 102.

In configuring a symbol as in FIG. 1, using the 16 CPs 102 followed by the 64 samples 101 to be actually given as the input of the FFT can overcome an effect by a multipath. For a phenomenon of an FFT window transition by a sampling clock offset, there has been mainly employed a method which recovers an FFT window position to an initial FFT window position set during an initial synchronization process, whenever needed, by evaluating an amount of phase transition in a tracking process.

Korean Laid-open Publication No. 2001-0083190 provides a method in which pilots are extracted from an OFDM signal that is FFT-transformed and then equalized in an OFDM system receiver, an FFT window adjustment factor and its related equalizer tap adjustment value are deduced by processing the extracted pilots, and an FFT window position correction and phase of the equalizer tap are controlled simultaneously based on the deduced value.

Korean Laid-open Publication No. 2001-0045947 discloses a timing correction apparatus and method of a digital broadcasting receiver which sets an FFT window timing in an initial acquisition mode and then performs this in a time domain as it is if its correction is required in a tracking mode, and tracks a discontinuous phase caused by the above process through a phase re-rotation at a next end of an FFT section.

Another prior art is "Tracking of Time Misalignments for OFDM Systems in Multipath Fading Channels" presented in IEEE Transactions On Consumer Electronics, Vol. 48, No. 4, November 2002. This article proposes a theoretical equation using a maximum likelihood estimation method and its actually simplified implementation scheme. Specifically, in such a maximum likelihood estimation method, an amount of time offset according to a position within an OFDM symbol is estimated and averaged by using the characteristics that a phase error at each pilot symbol position after FFT is proportional to a pilot position and a time offset in the presence of a specific time offset based on a well-known OFDM signal model.

An MB-OFDM UWB system transmits an OFDM symbol with lots of frequencies depending on a time frequency hopping pattern and is very sensitive to a phase rotation by a sampling clock offset at a demodulation end in view of OFDM characteristics. Further, such MB-OFDM UWB system suffers frequency selective fading by UWB channel.

Due to this ultra-wideband channel model characteristic, maintaining an FFT window derived based on the correlation characteristic of preamble during an initial synchronization process yields a limit to a correct recovery of an MB-OFDM UWB signal in demodulating a transmission signal of an MB-OFDM UWB system.

Namely, in implementing an MB-OFDM UWB system in full digital way, the performance deterioration phenomenon by the ultra-wideband multipath fading cannot be completely solved only by a method which recovers an FFT window position to an initial FFT window position set during an initial synchronization process to solve an FFT window transition problem caused by a sampling clock offset.

SUMMARY OF THE INVENTION

It is, therefore, a primary object of the present invention to provide a method for adjusting FFT window positioning in an MB-OFDM UWB system which is capable of overcoming both an FFT window transition phenomenon by a sampling clock offset and a performance deterioration phenomenon by an ultra-wideband multipath channel effect by adjusting an FFT window position in a receiver of an MB-OFDM UWB system.

In accordance with the present invention, there is provided a method for adjusting FFT window positioning in an MB-OFDM UWB system including the steps of: (a) acquiring an initial FFT window position and a frequency hopping position; (b) demodulating a received signal by using the initial FFT window position and the frequency hopping position acquired in the step (a); (c) transmitting received data information to a Media Access Control (MAC) layer with a reception frame (RX frame) structure and judging at the MAC layer whether or not a packet error is occurred based on Frame Check Sequences (FCSs); and (d) if no packet error is occurred, returning to the step (b), and if the packet error is occurred, changing a register map by using a predetermined interface line in a MAC-physical layer (MAC-PHY) interface to thereby adjust the FFT window position and the frequency hopping position, and then returning to the step (b).

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 8 is a flowchart illustrating a method for adjusting FFT window positioning in accordance with a preferred embodiment of the present invention.

DETAILED DESCRIPTION OF THE INVENTION

The above-mentioned objectives, features, and advantages will be more apparent from the following detailed description in association with the accompanying drawings, and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

Figure 2:
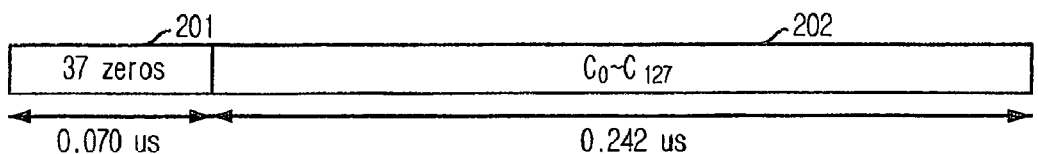
FIG. 2 is a view for explaining an example of a symbol structure of a conventional IEEE 802.15.3a MB-OFDM UWB system.

FIG. 2 is a view for explaining an example of a symbol structure of a conventional IEEE 802.15.3a MB-OFDM UWB system.

As shown therein, a symbol of the MB-OFDM UWB system is composed of 37 zeros 201 (32 zeros at a guard interval plus 5 zeros for channel switching) and 128 points 202 to be used as an input of FFT.

Figure 1:
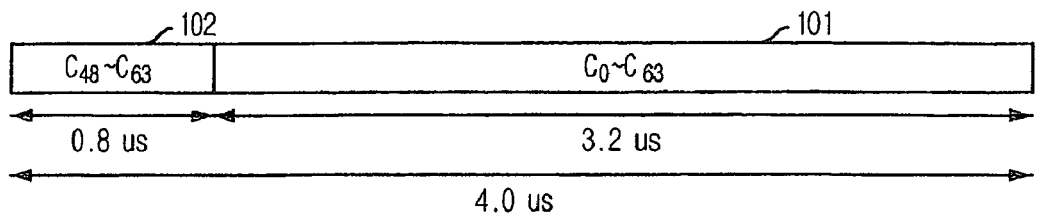
FIG. 1 shows a view for describing an example of a symbol structure of an existing IEEE 802.11a WLAN system.

The symbol of the MB-OFDM UWB system has a shorter time interval than that of the IEEE 802.15.3a WLAN system shown in FIG. 1, but is composed of more samples since its sampling clock is much higher. Because of this symbol characteristic of the MB-OFDM UWB system, a received signal suffers from an ultra-wideband multipath fading.

In the meantime, in order to overcome the multipath phenomenon, the present invention provides a scheme capable of changing an FFT window position and a channel switching position by taking into account 32 zeros (guard interval) relatively longer than 16 samples (guard interval) presented by the IEEE 802.11a WLAN system and 5 zeros for channel switching. These scheme and method will be described in more detail later.

Figure 3:
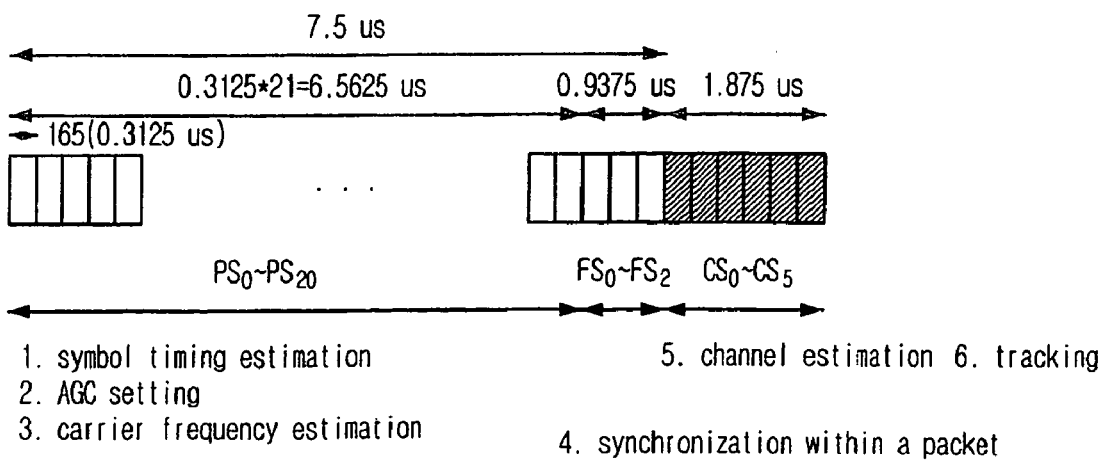
FIG. 3 offers a view for describing a synchronization process which employs a preamble structure provided by an MB-OFDM UWB system.

FIG. 3 offers a view for describing a synchronization process which employs a preamble structure provided by the MB-OFDM UWB system.

As described in FIG. 3, an initial FFT window position and a frequency hopping position are decided based on Packet Sequence (PS) symbols of a preamble through a symbol timing estimation synchronization process as a first process in a synchronization algorithm.

Figure 4A:
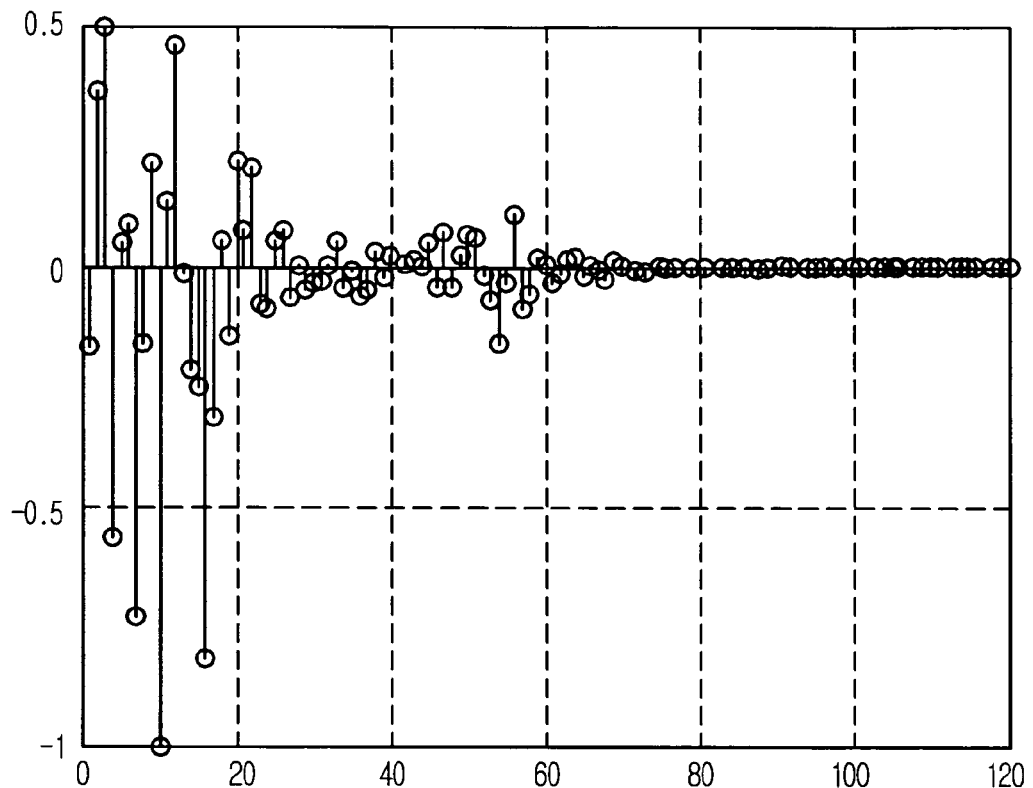
FIG. 4A is a view showing a common multipath impulse response.
Figure 4B:
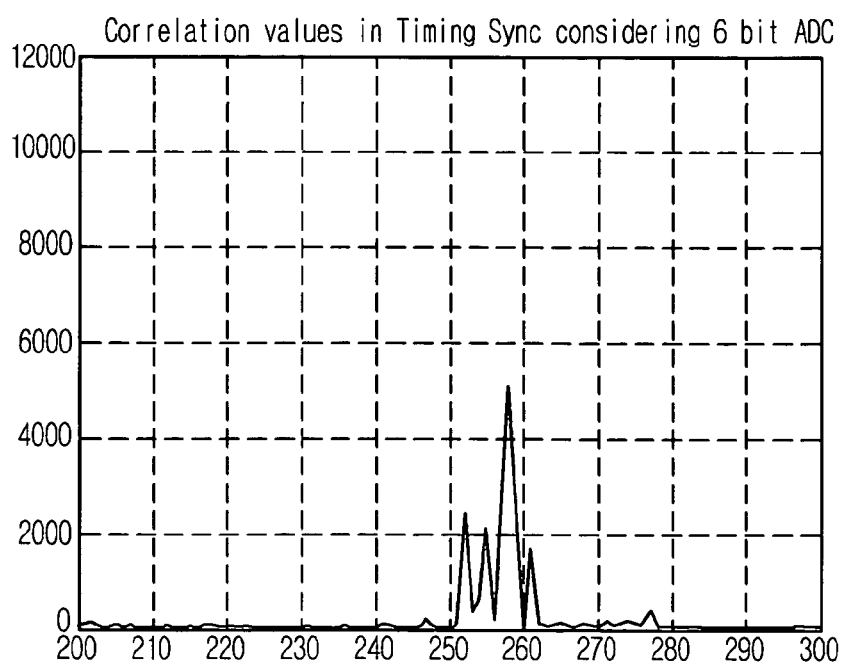
FIG. 4B is a view describing a cross-correlation value between a received preamble OFDM symbol and a reference preamble OFDM symbol in order to track an FFT window position in the symbol timing estimation process as the first process in the synchronization process of FIG. 3.

FIG. 4A is a view showing a common multipath impulse response; and FIG. 4B is a view describing a correlation value between a received preamble OFDM symbol and a reference preamble OFDM symbol in order to track an FFT window position in the symbol timing estimation process as the first process in the synchronization process of FIG. 3.

Under a multipath environment as shown in FIG. 4a, a correlation value between a PS symbol within a received preamble which suffers from the fading by such multipath and a reference PS can be detected as in FIG. 4b. In FIG. 4b, a point at which a peak is detected is mostly decided as an initial FFT window position.

Figure 5:
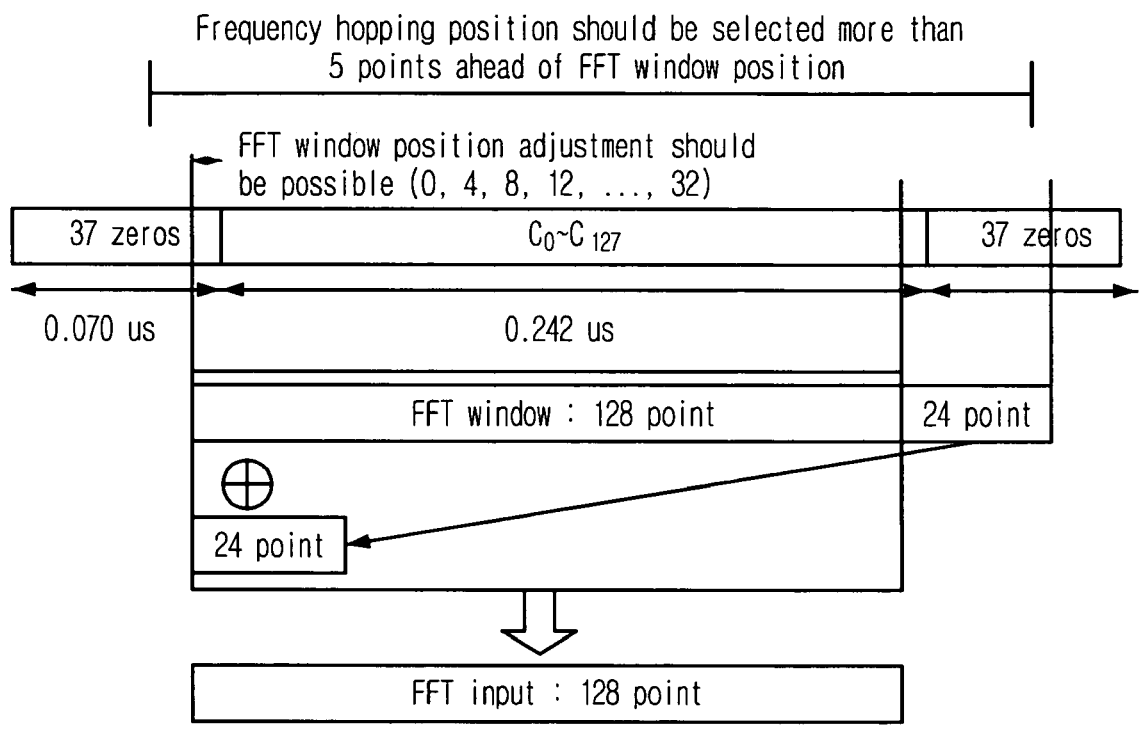
FIG. 5 is a view for describing a method for adjusting FFT window positioning in accordance with a preferred embodiment of the present invention.

FIG. 5 is a view for describing a method for adjusting FFT window positioning in accordance with a preferred embodiment of the present invention. Especially, FIG. 5 describes a method for overcoming the fading effect by a sampling clock offset and an ultra-wideband multipath channel and adjusting an FFT window position and a frequency hopping position so as to improve the reception probability of packets, and a method for generating an FFT input value, wherein a receiving end is basically designed in a 4-parallel structure.

In FIG. 5, because the receiving end is designed in the 4-parallel structure, an FFT window position and a frequency hopping position which can be corrected for one clock can be adjusted only in multiple of 4. Namely, in the 4-parallel reception structure shown in FIG. 5, an FFT window position should be adjusted to 0, 4, 8, 12, . . . , within the range of guard interval (32 zeros). In this case, the frequency hopping position should be always set 5 samples ahead of the FFT window position. In order to give the same effect as the Cyclic Prefix (CP) used for overcoming the multipath fading in the IEEE 802.11a WLAN system, there is actually adopted a scheme which uses a sum of maximum 32 samples from the end of 128-point FFT window and samples in the front part thereof as an FFT input.

In other words, the symbol structure of the MB-OFDM UWB system transmits zeros, instead of CP which repeatedly carries samples of about last ¼ of OFDM symbol, in the front part of OFDM symbol to be transmitted, in order to overcome the multipath fading, unlike the existing IEEE 802.11a WLAN system. Then, the receiving end employs a sum of maximum 32 samples from the end of 128-point FFT window and samples in the front part thereof as an FFT input to offer the same effect as the CP.

In this FFT window setting that does the FFT input value range, the MB-OFDM UWB system adjusts an FFT window position and a frequency switching position to be placed minimum 5 samples ahead of the FFT window position depending on an amount of sampling clock offset, a transmission mode, a payload transmission length, a fading by a ultra-wideband channel model. By doing so, a reception packet error rate at the receiving end can be reduced.

Table 1 below shows packet error circumstances by profiles obtained while adjusting an FFT window position and a frequency hopping position at a Signal to Noise Ratio (SNR) of 50 dB by applying a 480 Mbps mode among data transmission rates that can be provided by the MB-OFDM UWB system to 100 profiles of CM1 provided in a UWB channel model.

TABLE 1

| Profile_Num | FFT window position = 0. Frequency hopping position = −8 | | FFT window position = −4. Frequency hopping position = −12 | | FFT window position = −8. Frequency hopping position = −16 | | FFT window position = −12. Frequency hopping position = −20 | |
|---|---|---|---|---|---|---|---|---|
| | Header | Payload | Header | Payload | Header | Payload | Header | Payload |
| 1 | 0 | 0 | 0 | 0 | 0 | 0 | 0 | 0 |
| 2 | 0 | 0.0002 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0.0021 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0.021 | 0 | 0 | 0 | 0 | 0 | 0 |
| 12 | 0 | 0.033 | 0 | 0 | 0 | 0.0022 | 0 | 0.0005 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0.082 | 0 | 0 | 0 | 0 | 0 | 0 |
| 16 | 0 | 0 | 0 | 0 | 0 | 0 | 0 | 0 |
| 17 | 5 | 0.4681 | 11 | 0.4554 | 0 | 0.4066 | 0 | 0 |
| 18 | 0 | 0 | 0 | 0 | 0 | 0 | 0 | 0 |
| 19 | 0 | 0 | 0 | 0 | 0 | 0 | 0 | 0 |
| 20 | 0 | 0 | 0 | 0 | 0 | 0 | 0 | 0.0002 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0.0467 | 0 | 0.0136 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0.0031 | 0 | 0.3588 | 0 | 0 | 0 | 0 |
| 28 | 0 | 0 | 0 | 0 | 0 | 0 | 0 | 0 |
| 29 | 0 | 0 | 0 | 0 | 0 | 0 | 0 | 0 |
| 30 | 0 | 0 | 0 | 0 | 0 | 0 | 0 | 0 |
| 31 | 0 | 0 | 0 | 0 | 0 | 0 | 0 | 0 |
| 32 | 0 | 0 | 0 | 0 | 0 | 0 | 0 | 0 |
| 33 | 0 | 0 | 0 | 0 | 0 | 0 | 0 | 0 |
| 34 | 0 | 0 | 0 | 0 | 0 | 0 | 0 | 0 |
| 35 | 0 | 0 | 0 | 0 | 0 | 0 | 0 | 0.0001 |
| 36 | 0 | 0 | 0 | 0 | 0 | 0 | 0 | 0 |
| 37 | 0 | 0 | 0 | 0 | 0 | 0 | 0 | 0 |
| 38 | 0 | 0.0002 | 0 | 0 | 0 | 0 | 0 | 0 |
| 39 | 0 | 0 | 0 | 0 | 0 | 0 | 0 | 0 |
| 40 | 0 | 0 | 0 | 0 | 0 | 0 | 0 | 0 |
| 41 | 0 | 0.0005 | 0 | 0 | 0 | 0 | 0 | 0 |
| 42 | 0 | 0 | 0 | 0 | 0 | 0 | 0 | 0 |
| 43 | 0 | 0 | 0 | 0 | 0 | 0 | 0 | 0 |
| 44 | 0 | 0 | 0 | 0 | 0 | 0 | 0 | 0 |
| 45 | 0 | 0 | 0 | 0 | 0 | 0 | 0 | 0 |
| 46 | 0 | 0 | 0 | 0 | 0 | 0 | 0 | 0 |
| 47 | 0 | 0 | 0 | 0 | 0 | 0 | 0 | 0 |
| 48 | 0 | 0.0407 | 0 | 0 | 0 | 0 | 0 | 0 |
| 49 | 0 | 0 | 0 | 0 | 0 | 0 | 0 | 0 |
| 50 | 0 | 0 | 0 | 0 | 0 | 0 | 0 | 0 |
| 51 | 0 | 0 | 0 | 0 | 0 | 0 | 0 | 0 |
| 52 | 0 | 0 | 0 | 0 | 0 | 0 | 0 | 0 |
| 53 | 0 | 0 | 0 | 0 | 0 | 0 | 0 | 0 |
| 54 | 0 | 0.0054 | 0 | 0 | 0 | 0 | 0 | 0 |
| 55 | 0 | 0 | 0 | 0 | 0 | 0 | 0 | 0 |
| 56 | 0 | 0 | 0 | 0 | 0 | 0 | 0 | 0 |
| 57 | 0 | 0 | 0 | 0 | 0 | 0 | 0 | 0 |
| 58 | 0 | 0 | 0 | 0 | 0 | 0 | 0 | 0 |
| 59 | 0 | 0.0516 | 0 | 0 | 0 | 0 | 0 | 0 |
| 60 | 0 | 0 | 0 | 0 | 0 | 0 | 0 | 0 |
| 61 | 0 | 0 | 0 | 0 | 0 | 0 | 0 | 0 |
| 62 | 0 | 0 | 0 | 0 | 0 | 0 | 0 | 0 |
| 63 | 0 | 0 | 0 | 0 | 0 | 0 | 0 | 0 |
| 64 | 0 | 0 | 0 | 0 | 0 | 0 | 0 | 0 |
| 65 | 0 | 0 | 0 | 0 | 0 | 0 | 0 | 0 |
| 66 | 0 | 0 | 0 | 0 | 0 | 0 | 0 | 0 |
| 67 | 0 | 0.0175 | 0 | 0 | 0 | 0 | 0 | 0 |
| 68 | 0 | 0 | 0 | 0 | 0 | 0 | 0 | 0 |
| 69 | 0 | 0 | 0 | 0 | 0 | 0 | 0 | 0 |
| 70 | 0 | 0 | 0 | 0 | 0 | 0 | 0 | 0 |
| 71 | 0 | 0 | 0 | 0 | 0 | 0 | 0 | 0 |

TABLE 1-continued

| Profile_Num | FFT window position = 0. Frequency hopping position = -8 | | FFT window position = -4. Frequency hopping position = -12 | | FFT window position = -8. Frequency hopping position = -16 | | FFT window position = -12. Frequency hopping position = -20 | |
|---|---|---|---|---|---|---|---|---|
| | Header | Payload | Header | Payload | Header | Payload | Header | Payload |
| 72 | 0 | 0 | 0 | 0 | 0 | 0 | 0 | 0 |
| 73 | 0 | 0 | 0 | 0 | 0 | 0 | 0 | 0 |
| 74 | 0 | 0.0153 | 0 | 0 | 0 | 0 | 0 | 0 |
| 75 | 0 | 0 | 0 | 0 | 0 | 0 | 0 | 0 |
| 76 | 0 | 0.0002 | 0 | 0 | 0 | 0 | 0 | 0 |
| 77 | 0 | 0 | 0 | 0 | 0 | 0 | 0 | 0 |
| 78 | 0 | 0 | 0 | 0 | 0 | 0 | 0 | 0 |
| 79 | 0 | 0 | 0 | 0 | 0 | 0 | 0 | 0 |
| 80 | 0 | 0 | 0 | 0 | 0 | 0 | 0 | 0 |
| 81 | 0 | 0 | 0 | 0 | 0 | 0 | 0 | 0 |
| 82 | 0 | 0 | 0 | 0 | 0 | 0 | 0 | 0 |
| 83 | 0 | 0 | 0 | 0 | 0 | 0 | 0 | 0 |
| 84 | 0 | 0.0127 | 0 | 0 | 0 | 0 | 0 | 0 |
| 85 | 0 | 0 | 0 | 0 | 0 | 0 | 0 | 0 |
| 86 | 0 | 0.0064 | 0 | 0 | 0 | 0 | 0 | 0 |
| 87 | 0 | 0 | 0 | 0 | 0 | 0 | 0 | 0 |
| 88 | 0 | 0.007 | 0 | 0.0034 | 0 | 0 | 0 | 0 |
| 89 | 0 | 0 | 0 | 0 | 0 | 0 | 0 | 0 |
| 90 | 0 | 0 | 0 | 0 | 0 | 0 | 0 | 0 |
| 91 | 0 | 0 | 0 | 0 | 0 | 0 | 0 | 0 |
| 92 | 0 | 0 | 0 | 0 | 0 | 0 | 0 | 0 |
| 93 | 0 | 0 | 0 | 0 | 0 | 0 | 0 | 0 |
| 94 | 0 | 0 | 0 | 0 | 0 | 0 | 0 | 0 |
| 95 | 0 | 0.0004 | 0 | 0 | 0 | 0 | 0 | 0 |
| 96 | 0 | 0 | 0 | 0 | 0 | 0 | 0 | 0 |
| 97 | 0 | 0 | 0 | 0 | 0 | 0 | 0 | 0 |
| 98 | 0 | 0 | 0 | 0 | 0 | 0 | 0 | 0 |
| 99 | 0 | 0.0006 | 0 | 0 | 0 | 0 | 0 | 0.0004 |
| 100 | 0 | 0 | 0 | 0 | 0 | 0 | 0 | 0 |

Table 2 below exhibits an average Bit Error Rate (BER) and Packet Error Rate (PER) with respect to 100 profiles obtained in Table 1 above, and an average BER and PER with respect to 90 profiles except for 10 profiles that are under the worst environment.

TABLE 2

| Classification | FFT window position = 0. Frequency hopping position = -8 | FFT window position = -4. Frequency hopping position = -12 | FFT window position = -8. Frequency hopping position = -16 | FFT window position = -12. Frequency hopping position = -20 |
|---|---|---|---|---|
| PER(100) | 0.2100 | 0.0400 | 0.0200 | 0.0400 |
| BER(100) | 0.00815 | 0.00831 | 0.00409 | 0.00001 |
| BER(90) | 0.000394444 | 3.77778E-05 | 0 | 8.16889E-06 |
| PER(90) | 0.099 | 0.009 | 0 | 0.027 |

As can be seen from Table 1 and Table 2 above, the performance can be considerably improved in the profile environment that experiences the same multipath fading by adjusting the FFT window position and the frequency hopping position, in the MB-OFEM UWB system that suffers from the ultra-wideband multipath fading. This implies that the method of the present invention can considerably increase the packet reception probability at the receiving end, without modifying a complicated algorithm.

Figure 6:
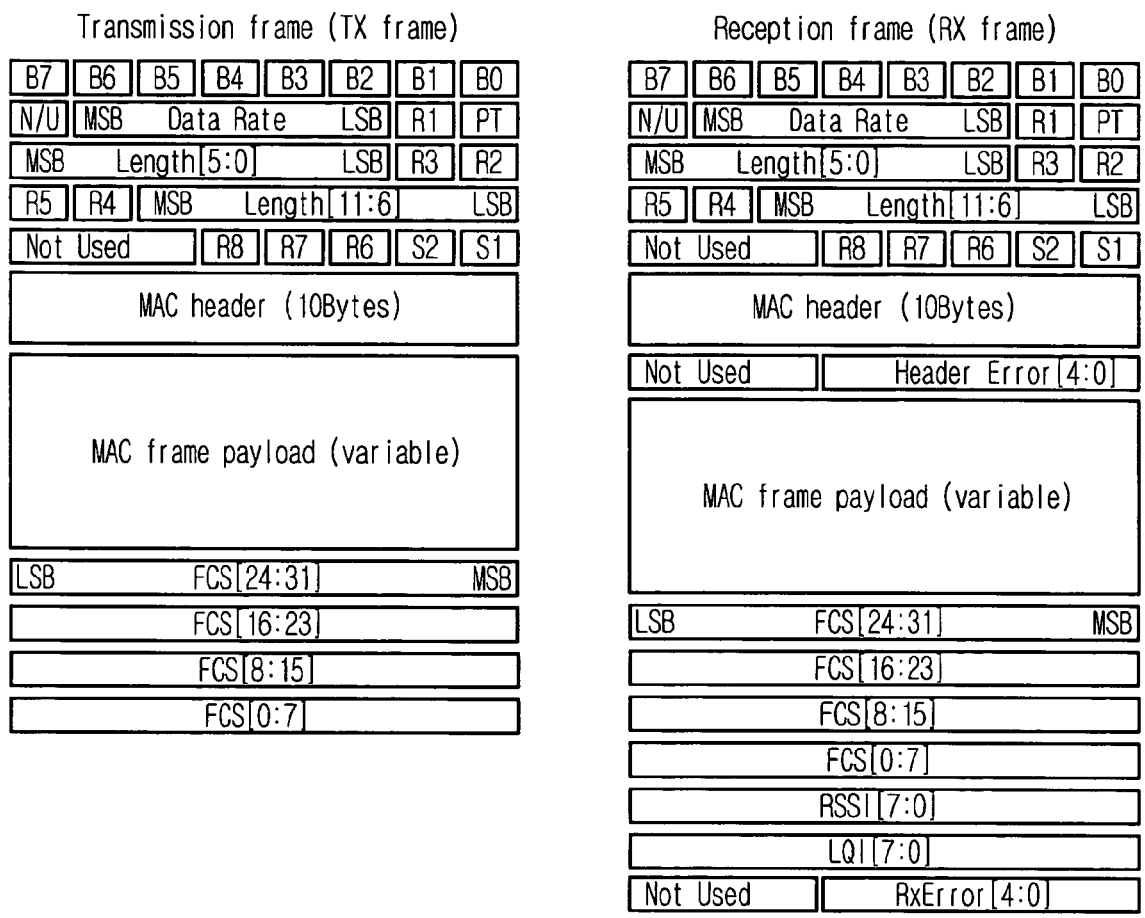
FIG. 6 is a view for describing an example of a frame structure of an MB-OFDM UWB system applied in the present invention.

FIG. 6 is a view for describing an example of a frame structure of the MB-OFDM UWB system to which the present invention is applied.

As illustrated in FIG. 6, a frame structure of the MB-OFDM UWB system is composed of a transmission frame (TX frame) and a reception frame (RX frame).

Frame Check Sequences (FCSs) are generated at a Media Access Control (MAC) layer based on the MAC-physical layer (MAC-PHY) interface standard and then transmitted via a modem transmission end. At a modem reception end, the FCSs are demodulated and then sent to the MAC layer; and, at the MAC layer, it can be confirmed whether an error is occurred in a whole packet.

Figure 7:
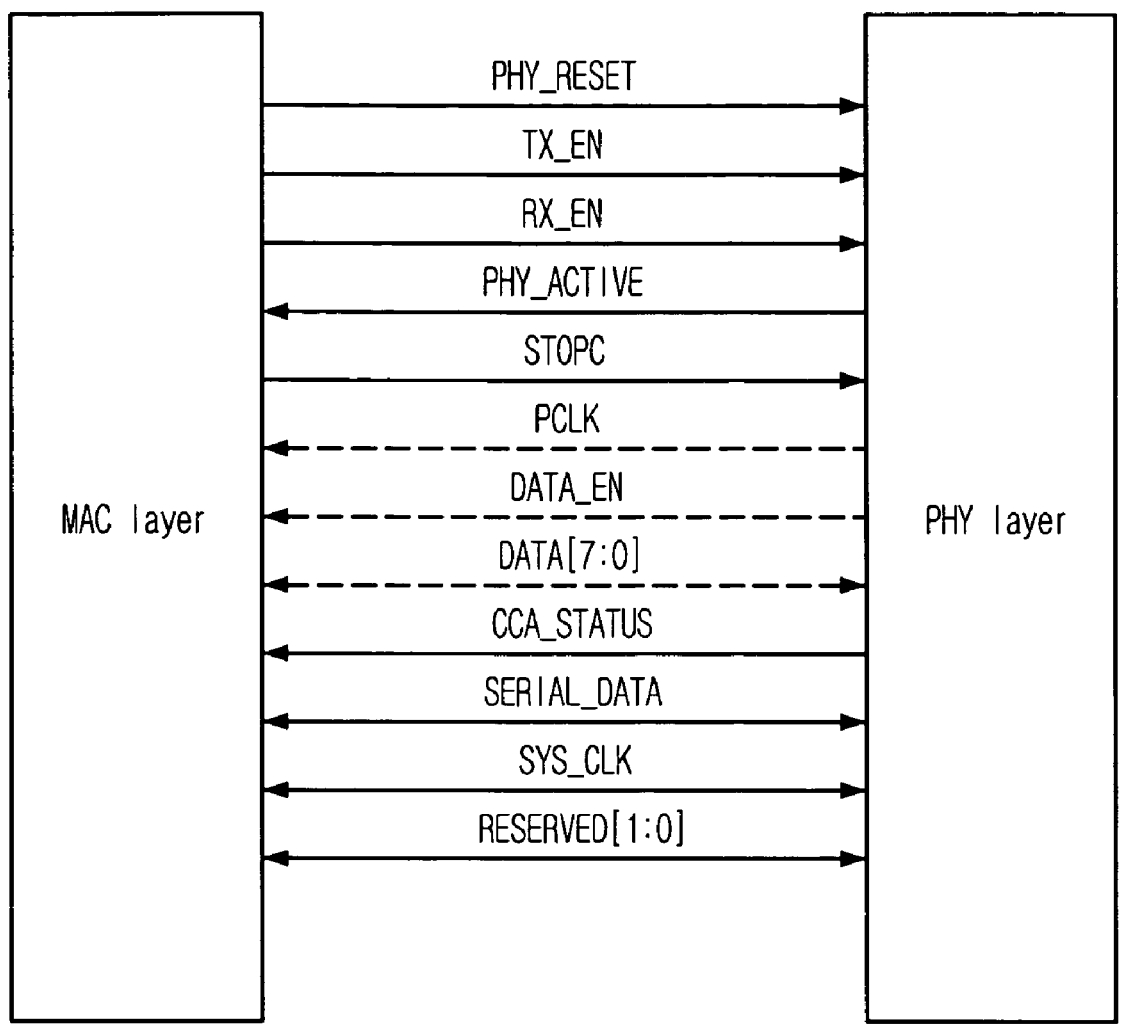
FIG. 7 is a view for describing an interface between a MAC layer and a physical layer in a method for adjusting FFT window positioning in accordance with a preferred embodiment of the present invention.

FIG. 7 is a view for describing an interface between a MAC layer and a physical layer in a method for adjusting FFT window positioning in accordance with a preferred embodiment of the present invention.

Referring to FIG. 7, lines used in the MAC-PHY interface include "PHY_RESET", "TX_EN", "RX_EN", "PHY_ACTIVE", "STOPC", "PCLK", "DATA_EN", "DATA[7:0]", "CCA_STATUS", "SERIAL_DATA", "SYS_CLK", and "RESERVED[1:0]".

In the multi-path environments, MB-OFDM UWB system can suffer extremely serious performance degradation according to the multipath condition even when the FFT window position is fixed to a position derived during an initial synchronization process. In this case, the packet error can be removed through a method of artificially adjusting the FFT window position.

To properly adjust the FFT window position, FCSs are first confirmed in the MAC layer. Then, when an error is continuously detected therefrom, a "RXCTL" register map is changed by using the "Serial-DATA" line presented by the MAC-PHY interface standard, thereby causing the modem to sequentially change the FFT window position. By repeating the process of again confirming the FCSs for the FFT window position so changed at the MAC layer, the FFT window position allowing the most good reception environment in the actual environment can be estimated. This method can extract a simplest and optimal reception environment in implementing a receiver actually, without using a separate complicated algorithm.

Meanwhile, the status of modem may be read out from the register map with the "SERIAL_DATA" line among the interface lines at the MAC layer, and the register map may be modified at the MAC layer in order to change the modem status.

FIG. 8 is a flowchart illustrating a method for adjusting FFT window positioning in accordance with a preferred embodiment of the present invention. That is, FIG. 8 describes a procedure which judges at the MAC layer whether any error is within a packet based on the FCSs of the transmission frame (TX frame) and the reception frame (RX frame) shown in FIG. 6, and changes the "RXCTL" value in the register map by using the "SERIAL_DATA" line in the MAC-PHY interface as shown in FIG. 7 to thereby correct the FFT window position and the frequency hopping position.

Specifically, at a first step S802, an initial FFT window position and a frequency hopping position are acquired through a timing synchronization process after Analog to Digital Conversion (ADC). Based on the acquired initial FFT window position and frequency hopping position, a received signal is demodulated at step S802.

Next, the received data information is sent to a MAC layer using a reception frame (RX frame) structure at step S803, wherein at the MAC layer, it is judged whether or not a packet error is arisen by using FCSs at steps S804 and S805.

If no packet error is arisen, the process of the present invention returns to step S802 for demodulating the received signal, and but, if the packet error is arisen, the process changes the register map with the "SERIAL_DATA line in the MAC-PHY interface, thereby adjusting the FFT window position and the frequency hopping position at step S806. After that, the process returns to step S802.

At this time, the range of the FFT window position that can be adjusted based on the "RXCTL" register map information should be limited to within the guard interval (32 zeros). If the packet error is not corrected within the range of the FFT window position adjustment that can be defined in the "RXCTL" register map, it is meant to suffer from the fading that the modem is not able to overcome.

As described above, the present invention can extract an optimal reception environment in a simplest way by using a MAC-PHY interface standard, without modifying a separate complicated algorithm, in order to overcome a sampling clock offset and an ultra-wideband fading environment in implementing a receiver actually by adjusting an FFT window to overcome the performance deterioration due to the sampling clock offset and multipath in an MB-OFDM UWB system using a time frequency hopping scheme that is being standardized as IEEE 802.15.3a physical layer protocol (Alt-PHY).

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-0121131 and No. 2006-0033728 filed with the Korean Intellectual Property Office on Dec. 9, 2005, and on Apr. 13, 2006, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A method for adjusting Fast Fourier Transform (FFT) window positioning in a Multi Band Orthogonal Frequency Division Multiplexing Ultra-Wideband (MB-OFDM UWB) system, the method comprising the steps of:
   (a) acquiring an initial FFT window position and a frequency hopping position;
   (b) demodulating a received signal of the MB-OFDM UWB system by using the initial FFT window position and the frequency hopping position acquired in said step (a);
   (c) transmitting received data information to a Media Access Control (MAC) layer using a reception frame (RX frame) structure and judging at the MAC layer whether or not a packet error is occurred based on Frame Check Sequences (FCSs); and
   (d) if no packet error occurs, returning to said step (b), and if the packet error occurs, changing a register map by using a predetermined interface line in a MAC-physical layer (MAC-PHY) interface to adjust the FFT window position and the frequency hopping position, and then returning to said step (b),
   wherein when the error is continuously detected by checking the FCSs at the MAC layer, said step (d) changes an "RXCTL" register map by using the predetermined interface line presented by the MAC-PHY interface protocol to cause the FFT window position to change in sequence, and repeats the process of again checking the FCSs for the changed FFT window position at the MAC layer to adjust the FFT window position.

2. The method as recited in claim 1, wherein said step (d) adjusts the FFT window position within a guard interval of 32 zeros based on the register map information.

3. The method as recited in claim 2, wherein the predetermined interface line is a "SERIAL_DATA" line in the MAC-PHY interface.

4. The method as recited in claim 3, wherein said step (d) reads out the status of a modem from the register map by using the "SERIAL_DATA" line among the MAC-PHY interface lines at the MAC layer, and changes the modem status of the register map at the MAC layer.

5. The method as recited in claim 2, wherein the FFT window position is configured in such a manner that the frequency hopping position is set to be placed more than 5 samples ahead of the FFT window position.

6. The method as recited in claim 1, wherein the FFT window position is configured in such a manner that zeros are transmitted before an OFDM symbol and a sum of maximum 32 samples from the end part of a 128-point FFT window and samples of a front part of the 128-point FFT window is used as an FFT input.

7. The method as recited in claim 1, wherein said step (a) determines the initial FFT window position and the frequency hopping position with packet sequence symbols of a preamble through a symbol timing estimation synchronization process that is a first process in a synchronization algorithm.

8. The method as recited in claim 7, wherein said step (a) detects a cross-correlation value between a packet sequence symbol within a reception preamble and a reference packet sequence to decide a point where a peak is detected as the initial FFT window position.

9. The method as recited in claim 1, wherein the FFT window position is configured in such a manner that zeros are transmitted before an OFDM symbol and a sum of maximum 32 samples from the end part of a 128-point FFT window and samples of a front part of the 128-point FFT window is used as an FFT input.

10. A computer readable storage medium (CRSM) having a software program that includes instructions for carrying out a method for adjusting Fast Fourier Transform (FFT) window positioning in a Multi Band Orthogonal Frequency Division Multiplexing Ultra-Wideband (MB-OFDM UWB) system, the method of the CRSM comprising the steps of:
(a) acquiring an initial FFT window position and a frequency hopping position;
(b) demodulating a received signal by using the initial FFT window position and the frequency hopping position acquired in said step (a);
(c) transmitting received data information to a Media Access Control (MAC) layer using a reception frame (RX frame) structure and judging at the MAC layer whether or not a packet error is occurred based on Frame Check Sequences (FCSs); and
(d) if no packet error is occurred, returning to said step (b), and if the packet error is occurred, changing a register map by using a predetermined interface line in a MAC-physical layer (MAC-PHY) interface to thereby adjust the FFT window position and the frequency hopping position, and then returning to said step (b),
wherein said step (d) adjusts the FFT window position within a guard interval (32 zeros) based on the register map information,
wherein the predetermined interface line is a "SERIAL_DATA" line in the MAC-PHY interface,
wherein said step (d) reads out the status of a modem from the register map by using the "SERIAL_DATA" line among the MAC-PHY interface lines at the MAC layer, and changes the modem status of the register map at the MAC layer,
wherein when the error is continuously detected by checking the FCSs at the MAC layer, said step (d) changes an "RXCTL" register map by using the "SERIAL_DATA" line presented by the MAC-PHY interface protocol to cause the modem to change the FFT window position in sequence, and repeats the process of again checking the FCSs for the changed FFT window position at the MAC layer to thereby adjust the FFT window position.

11. The CRSM as recited in claim 10, wherein the FFT window position is configured in such a manner that the frequency hopping position is set to be placed more than 5 samples ahead of the FFT window position.

12. The CRSM as recited in claim 11, wherein said step (a) detects a cross-correlation value between a packet sequence symbol within a reception preamble and a reference packet sequence to decide a point where a peak is detected as the initial FFT window position.

13. The CRSM as recited in claim 10, wherein the FFT window position is configured in such a manner that zeros are transmitted before an OFDM symbol and a sum of maximum 32 samples from the end part of a 128-point FFT window and samples of a front part of the 128-point FFT window is used as an FFT input.

14. The CRSM as recited in claim 13, wherein said step (d) adjusts the FFT window position within a guard interval of 32 zeros based on the register map information.

15. A method for adjusting Fast Fourier Transform (FFT) window positioning in a Multi Band Orthogonal Frequency Division Multiplexing Ultra-Wideband (MB-OFDM UWB) system, the method comprising the steps of:
(a) acquiring an initial FFT window position and a frequency hopping position;
(b) demodulating a received signal of the MB-OFDM UWB system by using the initial FFT window position and the frequency hopping position acquired in said step (a);
(c) transmitting received data information to a Media Access Control (MAC) layer using a reception frame (RX frame) structure and judging at the MAC layer whether or not a packet error is occurred based on Frame Check Sequences (FCSs); and
(d) if no packet error occurs, returning to said step (b), and if the packet error occurs, changing a register map by using a predetermined interface line in a MAC-physical layer (MAC-PHY) interface to adjust the FFT window position and the frequency hopping position, and then returning to said step (b), wherein the FFT window position is configured in such a manner that the FFT window position and the frequency switching position to be placed minimum 5 samples ahead of the FFT window position are adjusted and set depending on an amount of a sampling clock offset, a transmission mode, a payload transmission length and a fading by an ultra-wideband channel model.

16. The method as recited in claim 15, wherein said step (a) determines the initial FFT window position and the frequency hopping position with packet sequence symbols of a preamble through a symbol timing estimation synchronization process that is a first process in a synchronization algorithm.

17. The method as recited in claim 16, wherein said step (a) detects a cross-correlation value between a packet sequence symbol within a reception preamble and a reference packet sequence to decide a point where a peak is detected as the initial FFT window position.

18. The method as recited in claim 15, wherein the predetermined interface line is a "SERIAL_DATA" line in the MAC-PHY interface.

19. The method as recited in claim 18, wherein said step (d) reads out the status of a modem from the register map by using the "SERIAL_DATA" line among the MAC-PHY interface lines at the MAC layer, and changes the modem status of the register map at the MAC layer.

20. The method as recited in claim 15, wherein the FFT window position is configured in such a manner that zeros are transmitted before an OFDM symbol and a sum of maximum 32 samples from the end part of a 128-point FFT window and samples of a front part of the 128-point FFT window is used as an FFT input.

* * * * *